United States Patent [19]

Balzano

[11] Patent Number: 5,600,115
[45] Date of Patent: Feb. 4, 1997

[54] FLEXIBLE CABLE WITH SECURITY SYSTEM FOR CODE MARKINGS

[76] Inventor: Alfiero Balzano, 11762 Western Ave., Unit "O", Stanton, Calif. 90680

[21] Appl. No.: 586,987

[22] Filed: Jan. 16, 1996

[51] Int. Cl.$^6$ ............................................. G06K 5/00
[52] U.S. Cl. ........................ 235/382; 235/468; 235/491; 250/271
[58] Field of Search .................... 235/382, 468, 235/491; 250/271; 348/156, 143

[56] References Cited

U.S. PATENT DOCUMENTS

| | | | |
|---|---|---|---|
| 4,436,991 | 3/1984 | Albert et al. | 235/468 |
| 4,538,059 | 8/1985 | Rudland | 235/468 |
| 4,678,898 | 7/1987 | Rudland | 235/468 |
| 4,758,716 | 7/1988 | Mayer et al. | 235/470 |
| 4,853,524 | 8/1989 | Yamaguchi et al. | 235/468 |
| 5,204,526 | 4/1993 | Yamashita et al. | 235/493 |

*Primary Examiner*—Donald T. Hajec
*Assistant Examiner*—Jeffrey R. Filipek
*Attorney, Agent, or Firm*—Roger A. Marrs

[57] ABSTRACT

A system which includes an information transmitting element including flexible length of cable supporting an array of energy emitting elements of such sizes, shapes and spacings as to represent bar code markings, a carrier for the information transmitting element which is adapted to be mounted on a person or object, where its movement from one place to another requires control and where its admission to such places might be selectively denied, and a receiver element for detecting and determining the encoded information being transmitted.

15 Claims, 1 Drawing Sheet

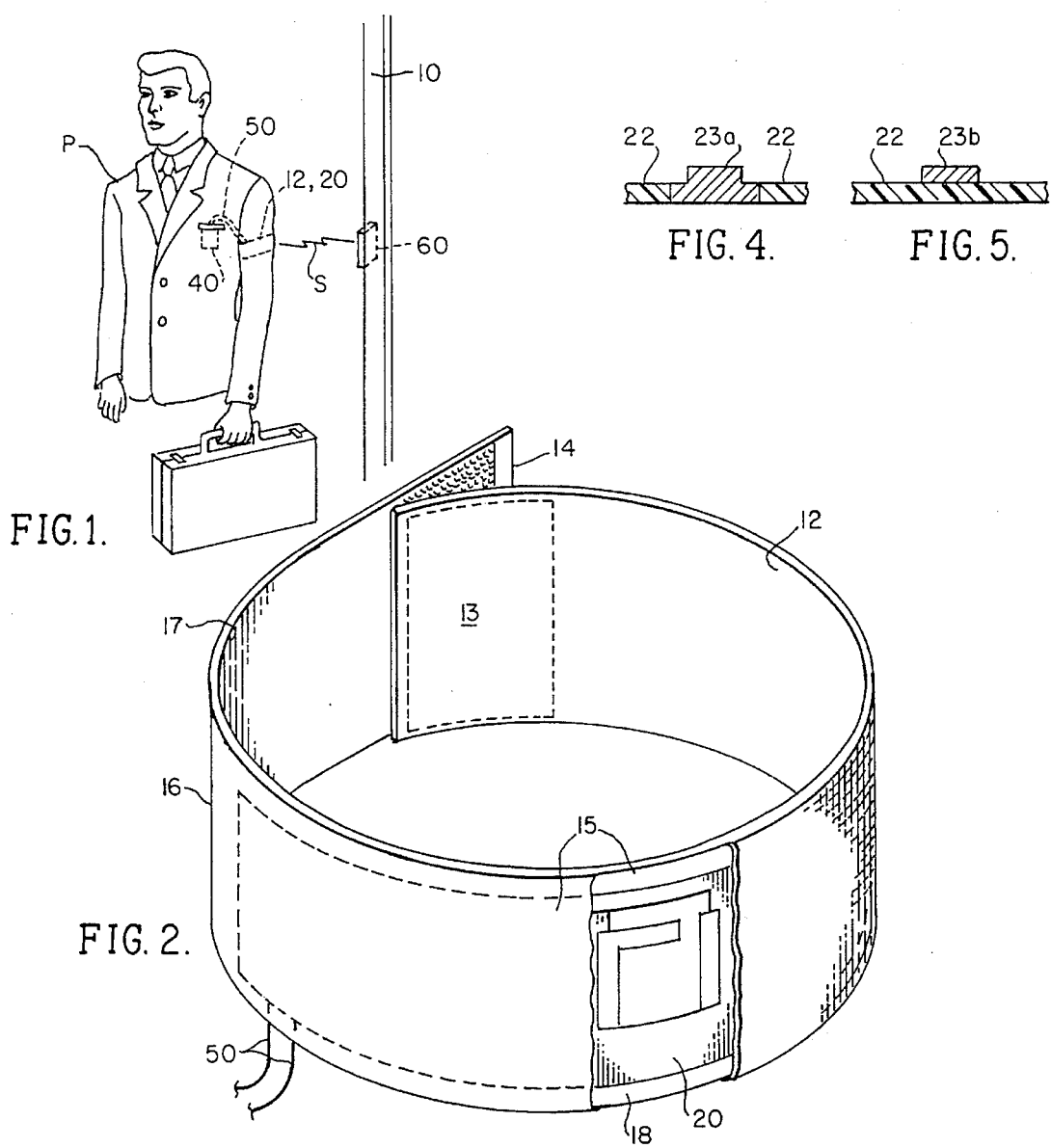
FIG. 1.
FIG. 2.
FIG. 4.
FIG. 5.
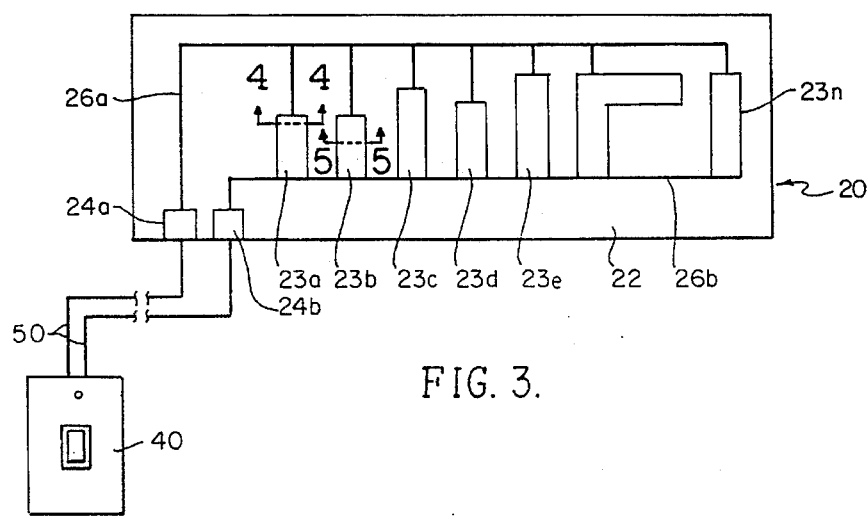
FIG. 3.

FLEXIBLE CABLE WITH SECURITY SYSTEM FOR CODE MARKINGS

BACKGROUND OF THE INVENTION

1. Field of the Invention

The present invention relates to information encoding and decoding systems, and more particularly to a flat flexible cable in which an array of conductive elements are arranged. The elements emit heat, and are provided with shapes, dimensions, and spacings which together effectively represent a bar code marking. The cables with the included elements are designed to be carried within clothing, such as an armband, or otherwise attached to objects which require monitoring, and are employed with a detecting and decoding security system.

2. Description of the Related Art

It is well-known in the prior art to encode information pertaining to particular products in bar code markings, and to apply such bar code markings to such products. This encoded information can be "read" by suitable equipment, such as optical scanners, and then decoded.

Typically, bar code markings applied directly on the product, or indirectly applied to the product by affixing a label or tag bearing the bar code markings.

It is further well known to apply bar code markings to products for security purposes, as for example to prevent unauthorized removal of products from desired areas of storage or access.

Against this background of known technology, it would be desirable to use bar code representations as indicia for controlling access to secured areas, where the indicia are able to be carried on the objects to be granted or denied access.

OBJECTS AND SUMMARY OF THE INVENTION

It is therefore an object of the present invention to provide a novel apparatus for encoding information for use in the identification of objects, especially in connection with security systems, and which will overcome all the deficiencies and drawbacks of similar systems currently known.

Another object of the invention is to provide an apparatus for assigning coded, identifying information to persons or objects for use in a security system where, when the person or object reaches an appropriate location, the information can be detected, and then decoded, to determine whether the object or person should be permitted or denied access to the location.

Still another object of the invention is to provide a flexible cable with energy emitting elements configured to represent bar code markings for use in an apparatus of the type described above.

These and other objects are attained by the system of the present invention which comprises an information transmitting member that includes a length of flexible cable supporting an array of energy emitting elements. The elements are preferably made of conductive materials, and are of such sizes, shapes and spacings as to collectively represent bar code markings. A carrier for the information transmitting element is adapted to be mounted on a person or object, where movement of the person or object from one place to another requires control and where admission to such places might be selectively denied. Receiver means is provided for detecting and decoding the encoded information.

BRIEF DESCRIPTION OF THE DRAWINGS

FIG. 1 shows one application of the invention;

FIG. 2 is a partial sectional view showing an information transmitting member according to the present invention arranged in a pocket of an armband;

FIG. 3 is a schematic representation of the information transmitting member showing the array of energy emitting elements;

FIG. 4 is a cross-sectional view of one energy emitting element, made by a subtractive method, and shown in FIG. 3; and FIG. 5 is a cross-sectional view of a second energy emitting element, made by an additive method, and shown in FIG. 3.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the actual scope of the invention can be best determined by the appended claims.

Referring now to FIG. 1, a person P is shown passing or standing in the vicinity of a support 10, such as a wall or doorpost, in his approach toward one or more "secured" means, i.e., locations where special advance clearances are necessary before admittance is permitted.

The person is shown to be wearing a band 12 secured about his arm and a conventional power pack 40 of a type which can be carried in the person's shirt pocket. The power pack is portable, and it is contemplated that it could also be secured in the person's belt.

The power pack is attached to the information transmitting member 20 of the present invention described in greater detail below. Member 20 is carried in a band 12 by conductive wires 50. The signal transmitting means in the band 12 emits a signal S which is detected by signal detecting and decoding apparatus 60 attached to the support post 10.

FIG. 2 shows a partial sectional view of the arm band 12. The band comprises a piece of flexible fabric having a length which is great enough to encircle a well-developed adult human upper arm and includes ends 13 and 14.

Interengaging, releasable fastening elements are preferably provided on facing portions of the ends 13, 14. Fastening elements contemplated for use in the present invention include buttons and button holes, male and female snap members, hook and loop fasteners, etc.

Arm band 12 is preferably made of a conventional fabric material, such as cotton, rayon, etc. A pocket 15 is formed in the arm band between the inner and outer layers 16, 17, and is accessable through a window or slot 18 in the outer layer 17. An encoded information transmitting member 20 in accordance with the present invention is shown inserted in the pocket 15 of the armband 12.

FIG. 3 schematically shows the information transmitting member 20 of the present invention. Member 20 includes a flat flexible insulating substrate 22 on which conductive members 23a, 23b, 23c, . . . , 23n are disposed. Heating of the cable member 20 is accomplished in a manner similar to that disclosed in applicant's prior U.S. Pat. No. 4,948,951.

Preferably, the conductive members 23a, 23b, 23c, . . . 23n are made of copper or another highly conductive metallic material, and are formed either through a subtractive process, such as etching (see the cross-section of member 23a in FIG. 4), or an additive process, such as applying a conductive layer of ink to the substrate (see the cross-section of member 23b in FIG. 5).

The wires 50 connect the power pack 40 with conductive lands or pads 24 located at an edge of the substrate 22. The wires could be soldered to the lands 24 or mechanically secured to the lands via conductive clips.

The members 23a, 23b, 23c, . . . 23n are preferably formed on one surface of the substrate 22, and have varying lengths, shapes and spacings. A conductive path 26a connects one land 24a with one end of each of the members 23a, 23b, 23c, . . . , 23n, and a second conductive path 26b connects the other land 24b with the other end of the members 23a, 23b, 23c, . . . 23n to form an electrical circuit.

When the power pack is activated, the members 23a, 23b, 23c, . . . 23n act as resistors in the circuit and heat up to a temperature level where infrared radiation is emitted. Due to their width, height, shape and spacing, the members 23a, 23b, 23c, . . . 23n collectively present a thermal signal representative of a code marking (as a result of the variations in height, shape and spacing)when heated to the infrared radiation emitting temperature.

The invention contemplates that the signal reading apparatus 60 could be an electro-optical detection system, with detectors positioned wherever required to monitor the locations over which control is required. The invention further contemplates that the widths, heights, shapes and spacings of the heat emitting members 23a, 23b, 23c, . . . 23n could be so varied as to create an infinite number of codes.

While the present invention has been described in conjunction with specific embodiments thereof, it is evident that many alternatives, modifications, and variations will be apparent to those skilled in the art in light of the foregoing description. Accordingly, the present invention is intended to embrace all alternatives, modifications, and variations which fall within the spirit and scope of the appended claims.

What is claimed:

1. An identification system for use in determining whether to permit objects access to a preselected location, comprising:

an information transmitting element adapted to be carried by an object, said information transmitting element including a flexible substrate and an array of heat energy emitting members disposed on said substrate, said heat energy emitting members collectively being of such sizes, shapes and spacings as to present a bar code marking, a carrier for said transmitting element adapted to be mounted on said object, and a receiving element for detecting the heat energy emitted by said heat energy emitting members and decoding the encoded information being transmitted, whereby if the information represented by said bar code marking satisfies preexisting conditions required for access to said location, said object is permitted to enter said location.

2. The identification system of claim 1, wherein said object is a person, and said carrier for said transmitting element comprises an arm band having a pocket in which said transmitting element is inserted.

3. The identification system of claim 2, and further including a power pack for providing power to said transmitting element.

4. The identification system of claim 1, wherein said array of heat energy emitting elements are electrically connected to one another by conductive paths to form a circuit, and said information transmitting element further includes a power supply which is electrically coupled to said circuit.

5. The identification system of claim 4, wherein said heat energy emitting elements are arranged in parallel in said circuit.

6. The identification system of claim 1, wherein said heat energy emitting elements are formed on said substrate by an additive process of depositing conductive ink.

7. The identification system of claim 1, wherein said heat energy emitting elements are formed on said substrate by a subtractive process of etching.

8. An electrical cable component adapted to be carried in an armband for producing an information bearing signal, comprising:

a flexible insulating substrate, and an array of heat emitting elements disposed on said substrate, each of said heat emitting elements having a configuration and being arranged adjacent a neighboring heat emitting element in such a manner as to represent a bar code marking.

9. The component of claim 8, wherein said heat emitting elements are electrically connected together via conductive paths to form a circuit.

10. The component of claim 9, wherein said heat emitting elements are arranged in parallel in said circuit.

11. The component of claim 9, and further including a power supply, said power supply being electrically connected with said circuit.

12. The component of claim 9, wherein said configuration is substantially rectangular.

13. The component of claim 9, wherein said configuration is substantially polygonal.

14. The component of claim 8, wherein said heat emitting elements are formed through a process of depositing conductive ink on said substrate.

15. The component of claim 8, wherein said heat emitting elements are formed through an etching process.

* * * * *